(12) United States Patent
Dentinger

(10) Patent No.: US 6,267,551 B1
(45) Date of Patent: Jul. 31, 2001

(54) MODULAR HYDRAULIC TURBINE

(75) Inventor: Jean-Claude Dentinger, Beauport (CA)

(73) Assignee: NRJO Inc., Quebec (CA)

( * ) Notice: Subject to any disclaimer, the term of this patent is extended or adjusted under 35 U.S.C. 154(b) by 0 days.

(21) Appl. No.: 09/420,317

(22) Filed: Oct. 19, 1999

(51) Int. Cl.$^7$ .................................................. F03B 13/12
(52) U.S. Cl. ........................................ 415/3.1; 415/214.1
(58) Field of Search ............................. 415/3.1, 4.3, 4.5, 415/111, 176, 180, 182.1, 199.4, 213.1, 214.1, 219.1, 906, 908; 416/198 A, 198 R, 203

(56) References Cited

U.S. PATENT DOCUMENTS

| | | | |
|---|---|---|---|
| 4,123,666 | * 10/1978 | Miller | 415/110 X |
| 4,258,271 | 3/1981 | Chappell et al. | 290/54 |
| 4,475,334 | * 10/1984 | Kuwabara | 415/26 X |
| 4,531,888 | * 7/1985 | Buchelt | 415/148 |
| 5,040,945 | 8/1991 | Levesque | 415/124.1 |
| 5,490,768 | * 2/1996 | Veronesi et al. | 417/356 |

FOREIGN PATENT DOCUMENTS

| | | | |
|---|---|---|---|
| 59-211765 | * 11/1994 | (JP) | 415/213.1 |
| 7-103125 | * 4/1995 | (JP) | 415/213.1 |

* cited by examiner

Primary Examiner—John E. Ryznic
(74) Attorney, Agent, or Firm—Collard & Roe, P.C.

(57) ABSTRACT

A modular hydraulic turbine made of a small number of components that are cast or molded, and that can easily be assembled and/or interchanged whenever required. The turbine has a cylindrical inlet unit through water may enter and an angular tubular outlet unit through water may enter escape; a central cone-shaped hub having a plurality of incurved blades; a shaft having a front end extending into the hub and a rear end portion engaging and extending outside the outlet unit; a hollow rotor rigidly connected to the shaft and having a plurality of incurved blades, the rotor causing the shaft to rotate when water flows inside the turbine; and a watertight casing for rotatably supporting the rear end of the shaft. The rear end portion of the shaft of the turbine is devised to be connected to a power generator, especially an electric generator, to produce energy upon rotation of the shaft. Depending on its size and the strength of the water stream, from 10 to 1200 kW/hour can easily be generated.

14 Claims, 9 Drawing Sheets

MODULAR HYDRAULIC TURBINE

BACKGROUND OF THE INVENTION a) Field of the Invention

The present invention relates to a modular hydraulic turbine. By "modular" turbine, there is meant a turbine made of a small number of components that are cast or molded, and can easily be assembled and/or interchanged whenever required.

The invention also relates to the combination of such a modular hydraulic turbine with an electric generator.

b) Brief Description of the Prior Art

Large hydraulic turbines for use to convert the energy of water flowing from a reservoir into electric and/or mechanical energy, are well known and extensively used worldwidely, especially in large dams.

Hydraulic turbines of smaller size for use in small dams, water falls and rivers, are also known. As non-restrictive examples of such "smaller" turbines, reference can be made to U.S. Pat. No. 4,258,271 of 1981 to Walter J. CHAPPELL et al and U.S. Pat. No. 5,040,945 of 1991 to Normand L ÉVESQUE. However, these turbines are expensive since they are complicated to build, and/or not very efficient energetically.

OBJECTS AND SUMMARY OF THE INVENTION

A first object of the present invention is to provide an hydraulic turbine which is modular in structure and made of a small number of components that are easy to assemble, wear-resistant, durable and of very friendly maintenance.

Another object of the invention is to provide a modular hydraulic turbine which is very simple in structure and easy to assemble and install with conventional bolts, screws and anchoring pieces, thereby making it convenient for use by non-specialized work-force.

A further object of the invention is to provide a modular hydraulic turbine of the above mentioned type, which, thanks to the particular shape and positioning of its blades, needs only a water-stream downward slope of 20 to 40 meters to be efficient and to generate up to 1200 kW/hour.

Still another object of the invention is to provide a modular hydraulic turbine of the above mentioned type which, thanks to its structure, does not need for external lubrification for its moving components and is almost free of any cavitation problem.

In accordance with the invention, these objects are achieved with a modular hydraulic turbine comprising:

- a cylindrical inlet unit through which water may enter, the inlet unit being made of one piece and having a longitudinal axis, a central cone-shaped hub provided with a central rearwardly opening cavity aligned with the longitudinal axis, and a plurality of incurved blades projecting radially at a same first angle all around the hub; and

- a tubular outlet unit made of one piece, the outlet unit having a front portion and a rear portion, the front portion being cylindrical in shape and having a longitudinal axis coaxial with the axis of the cylindrical inlet unit, the rear portion extending at an angle relative to the front portion.

Means are provided for rigidly connecting the inlet and outlet units to form a bent tubular water tight housing through which water may flow.

The turbine also comprises a shaft coaxial with the longitudinal axis. This shaft has a front end portion extending at least partially and rotatably into the central cavity of the hub, a central portion extending within the front portion of the outlet unit, and a rear end portion engaging the rear portion of the outlet unit and extending outside the housing.

A casing coaxial with the longitudinal axis is rigidly connected to the outlet unit outside of the same. This casing comprises sealing means for providing a watertight joint at a spot where the shaft extends outside the housing, and mounting means for rotatably supporting the rear end of said shaft.

A hollow rotor is rigidly connected to the shaft. The rotor is mounted proximate the hub and comprises a central core and a plurality of incurved blades projecting radially outwardly at a same second angle all around the core, the second angle being in a direction opposite to the first angle of the blades of the hub. As can be understood, the rotor causes the shaft to rotate when water flows inside the housing.

Preferably, the hollow rotor is cone-shaped and define together with the hub an ovoid-shaped member and the ovoid-shaped member comprises lubrification means for lubricating the front end portion of the shaft extending into the central cavity of the hub. Advantageously, the lubrication means comprises:

- an axial hole extending from the rearwardly opening cavity of the hub up to a front exterior surface thereof; and

- spacing means connected to the rearwardly opening cavity for providing a gap between the hub and the rotor.

The axial hole, the rearwardly opening cavity and spacing means altogether provide a path wherein water may flow, thereby lubricating and cooling the front end portion of the shaft.

Preferably also, the inlet unit, the outlet unit, the shaft, the rotor and/or the casing are made of a material selected from the group consisting of stainless steel, plastic materials and aluminum.

As it can be understood, the rear end portion of the shaft of the turbine is devised to be connected to a power generator, especially an electric generator, to produce energy upon rotation of the shafts. Depending on its size and the strength of the water stream, from 10 to 1200 kW/hour can easily be generated.

The invention and its numerous advantages will be better understood upon reading the following non-restrictive description of a preferred embodiment of it, made with reference to the accompanying drawings.

DESCRIPTION OF A PREFERRED EMBODIMENT OF THE INVENTION

Figure 1:
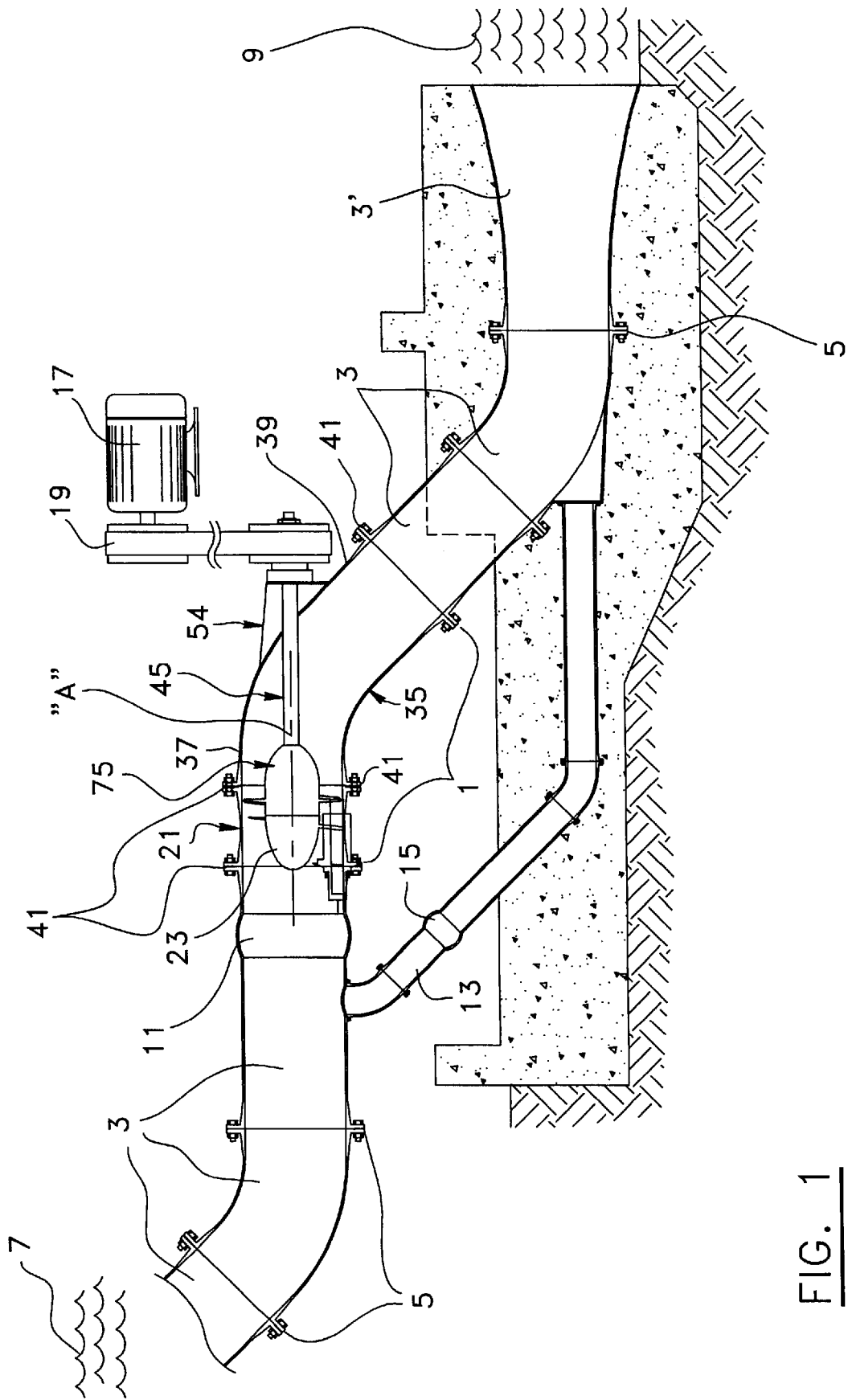
FIG. 1 is a schematic cross-section representation of the water duct of a dam incorporating a modular hydraulic turbine according to a preferred embodiment of the invention.

As aforesaid, FIG. 1 is illustrative of the water duct of a dam incorporating a modular hydraulic turbine 1 according to a preferred embodiment of the invention. As is shown in this Figure, the turbine 1 is mounted in line in the duct which is preferably made of PVC or high density polyethylene and comprises pipe sections 3, 3' connected to each other by means of socket head fastening bolts 5. The duct extends from a water reservoir 7, a water fall or even a river down to a water disposal outlet or channel 9 that must necessarily be positioned at a lower level from 2 m to 100 m, preferably 20 to 40 meters below the inlet of the duct in the water reservoir 7. If required, a water gate 11 can be incorporated into one of the pipe sections 3 upstream of the turbine 1. A derivation pipe 13 incorporating a drift valve 15 can also be provided. Moreover, the last pipe section 3' can be shaped as a nozzle to act as a suction device. All of these features are commonly used in this field and need not be further described.

As shown, the turbine 1 according to the preferred embodiment of the invention is made of a very few number of components. These components are preferably made of gravity cast stainless steel eventhough some of them could alternatively be made of cast aluminum and/or molded plastic material. These components include:

a cylindrical inlet unit 21 through which water enters;

a tubular outlet unit 35;

a shaft 45; and a hollow rotor 75 mounted on the shaft 45.

Figure 5B:
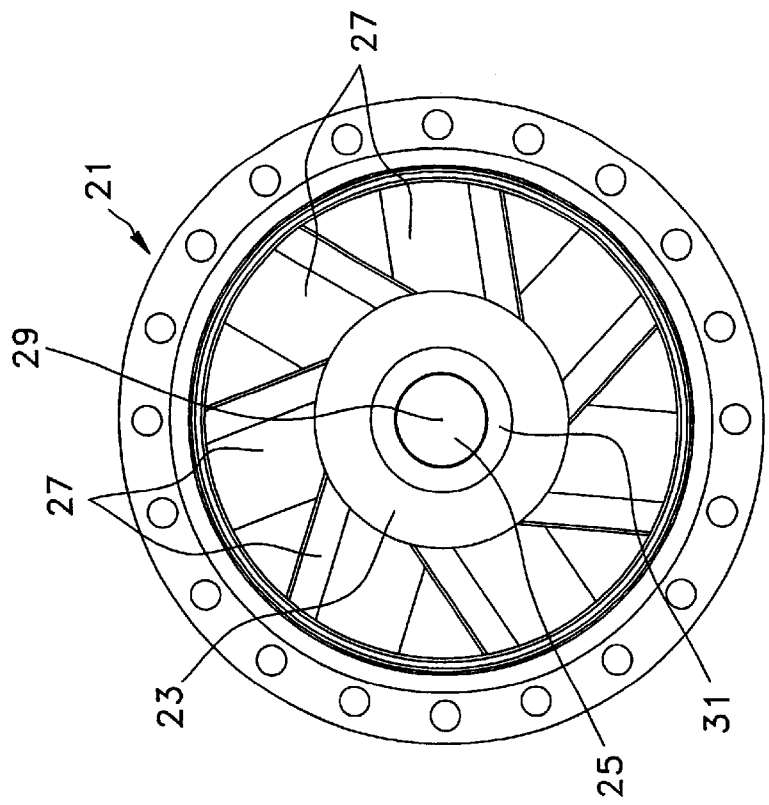
FIGS. 5a and 5b are front perspective and rear elevational views respectively, of the inlet unit of the turbine according to the preferred embodiment of the invention shown in FIGS. 1 to 2.
Figure 5A:
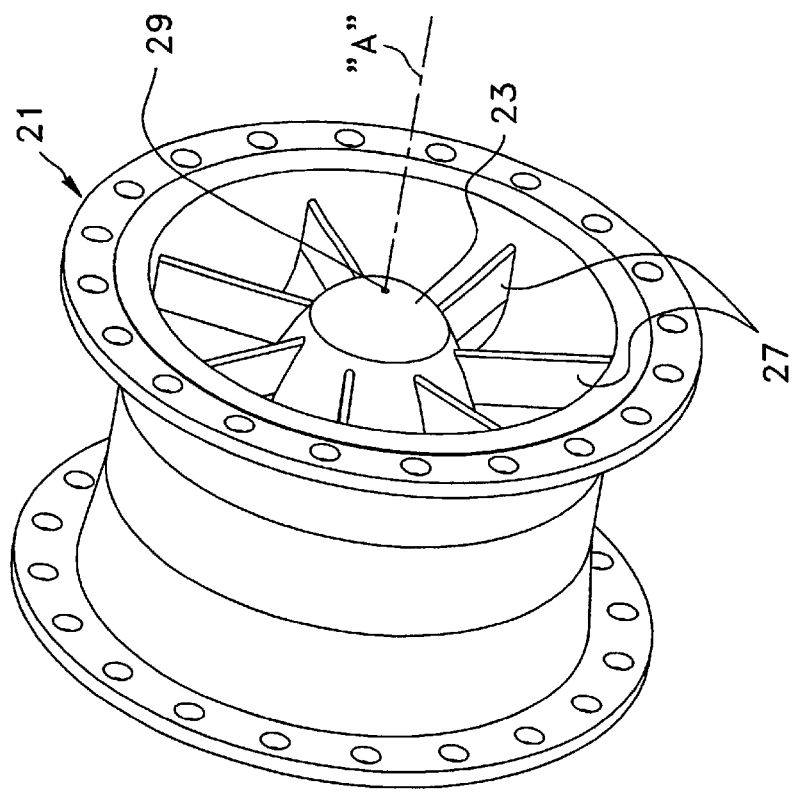

As is better shown in FIGS. 5a and 5b, the cylindrical inlet unit 21 is made of one piece and has a longitudinal axis "A", a central cone-shaped hub 23 provided with a central rearwardly-opening, plastic-coated cavity 25 aligned with the longitudinal axis, and a plurality of incurved blades 27 projecting radially at a same first angle all around the hub 23. In the illustrated embodiment, the inlet unit 21 comprises seven incurved blades 27 whose purpose is to push and impart to the water a rotative motion that increases the power. An axial hole 29 preferably extends centrally from the front exterior surface of the hub 23 down to the cavity 25. This hole 29 allows water to enter into the cavity shown in FIG. 3, the cavity 25 within the hub is jacketed by a plastic coating 31 that is detachably connected by means of screw 33 and is resistant to wear, abrasion, compression and dilation. The hole 29 and coating 25 which actually acts as a spacing means and forms a gap within the cavity, altogether allow water to enter under pressure into the cavity and to lubricate the front end portion of the shaft 45 located thereon. Although less preferable, other spacing means comprising grease and/or other roller bearing could also be used according to the present invention.

Figure 2:
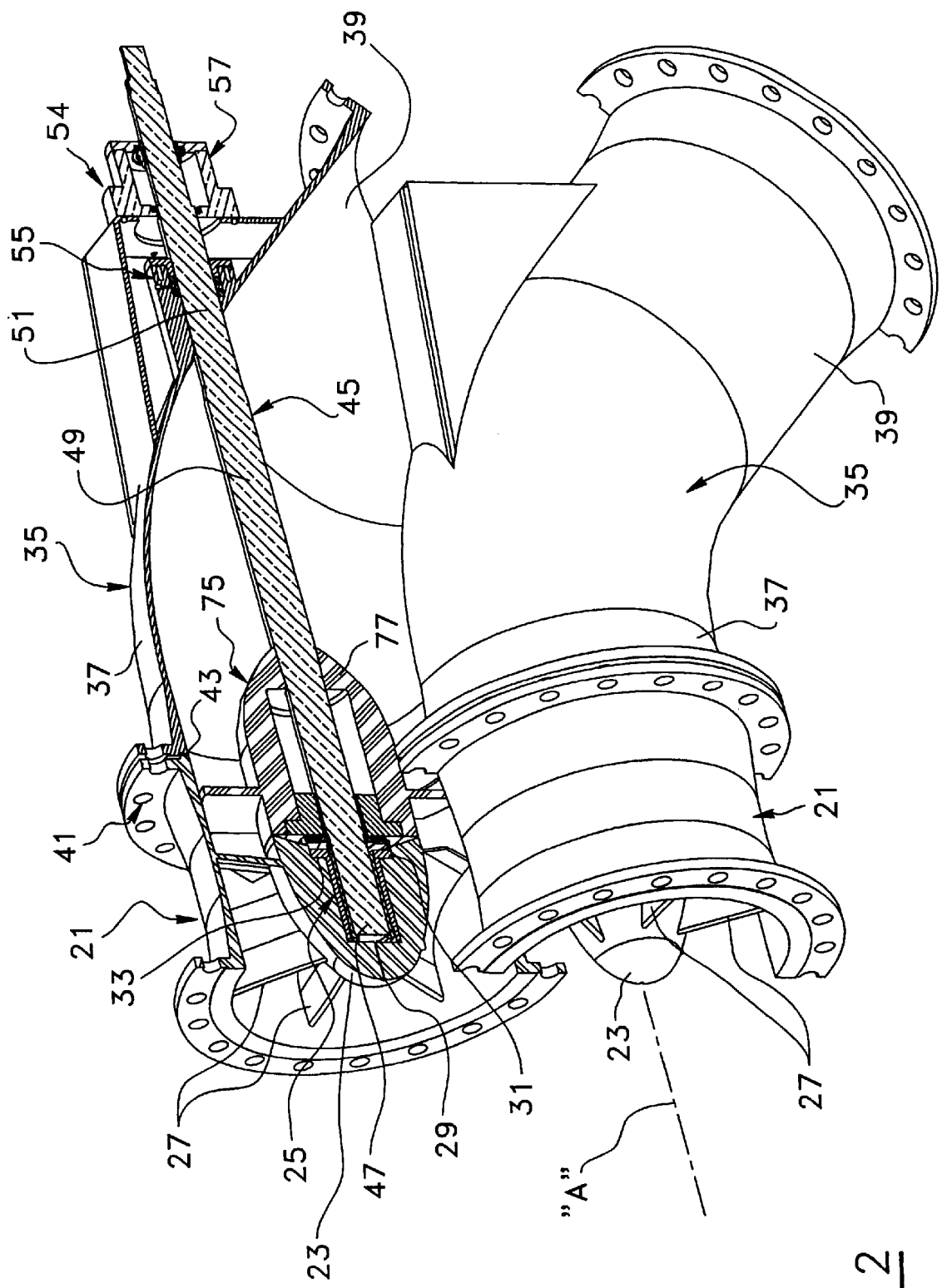
FIG. 2 is a perspective view of the turbine according to the preferred embodiment of the invention shown in FIG. 1, wherein the turbine is cut into two halves along a vertical central plane.

Referring back to FIGS. 1 and 2, the tubular outlet unit 35 is also made of one piece and has front portion 37 and a rear portion 39. The front portion 37 is cylindrical in shape and has a longitudinal axis coaxial with the axis "A" of the cylindrical inlet unit. The rear portion 39 extends at an angle inferior to 90° relative to the front portion 37 preferably at 850. In the illustrated embodiment, this angle is equal to about 45° but it could vary within a broad range.

Figure 3:
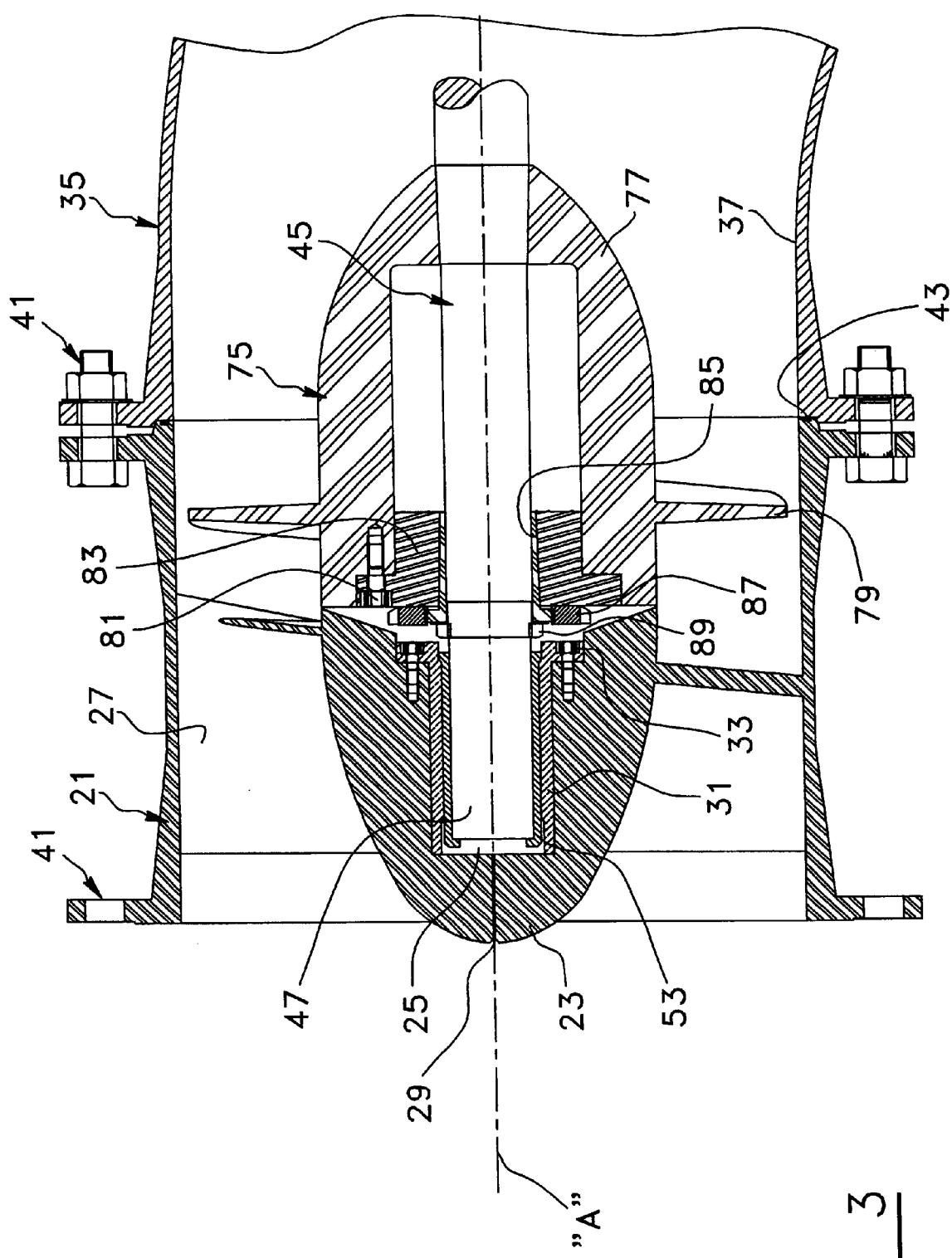
FIG. 3 is a side elevational cross-section view of the front portion of the turbine according to the preferred embodiment of the invention shown in FIGS. 1 and 2.

Means are provided for rigidly connecting the inlet and outlet units 35, 37 so as to form a bent, tubular water tight housing through which water may flow. Means are also provided for connecting the front and rear ends of the so-formed housing to the adjacent pipe sections 3. As shown in FIG. 3, these means preferably comprise socket head fastening bolts 41 similar to the fastening bolts 5. Advantageously, an O-ring 43 can be positioned at the junction between both units.

The shaft 45 is generally cylindrical and coaxial with the longitudinal axis "A". This shaft 45 has a front end portion 47 extending at least partially and rotatably into the central cavity 25 of the hub 23. It also has a central portion 49 extending within the front portion of the outlet unit, and a rear end portion 51 engaging the rear portion of the outlet unit and extending outside the housing. As better shown in FIG. 3, the front end portion 47 of the shaft is jacketed by a plastic coating 53 that is resistant to wear, abrasion, compression and dilatation. As already explained hereinabove, the water that enters through the hole 29 into the gap formed by the coatings 31 and 53, allows for rapid rotation of the shaft without excess wear. As shown, the diameter of the shaft 45 may vary along its length so as to improve its inertia and rotation speed. As its rear end portion 51, the diameter of the shaft retracts at angles so as to be squeezed into a roller bearing cage 54 and held therein.

Figure 4:
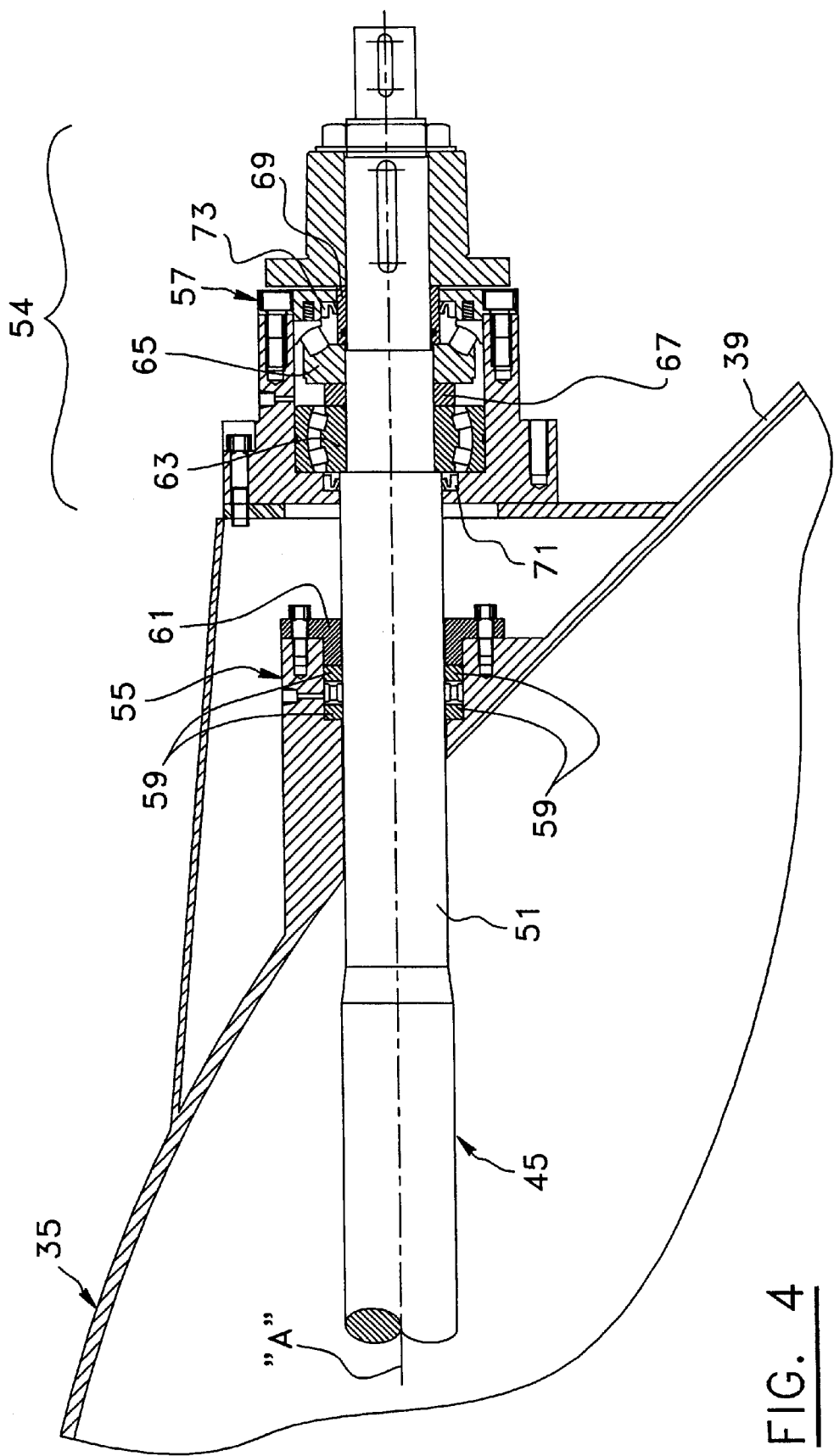
FIG. 4 is a side elevational cross-section view of part of the rear portion of the turbine according to the preferred embodiment of the invention shown in FIGS. 1 to 2.

As is better shown in FIG. 4, the cage 54 referred to hereinabove is actually a casing that is coaxial with the longitudinal axis and rigidly connected to the outlet unit 35 outside of the same. This casing comprises sealing means 55 for providing a watertight joint at a spot where the shaft 45 extends outside of the housing, and mounting means 57 comprising at least one oil lubricated roller bearing for rotatively supporting the rear end of the shaft 45. As shown in this preferred embodiment, the sealing means 55 comprise two spaced part O-rings 59 held by a joint fixture 61 and the mounting means 57 comprises a first roller bearing 63, a second roller bearing 65 extending at 45° for holding the shaft 45 in position within the turbine, bearing spacers 67 and 69, a O-ring 71 and a tension spring seal 73. All these elements are embedded into a close chamber and lubricated with oil, as is known per se.

As shown in FIG. 1, the rear end portion of the shaft 45 projects outwardly from the housing of the turbine due to the shape of the same. This rear end portion can be connected to a power generator, preferably an electric generator 17, either by direct connection or via a driving belt 19 (as shown) or a gear box.

The last basic component of the turbine 1 is the hollow rotor 75. In the illustrated embodiment, this rotor 75 comprises a hollow, cone-shaped central core 77 slid into and connected to the shaft 45 so as to extend adjacent to the rear surface of the hub 23 of the inlet unit 21 and to define together an ovoid-shaped member that reduces as much as possible the generation of eddy within the turbine. The rotor 75 also comprises a plurality of incurved blades 79 projecting radially outwardly from the core 77 at a same second angle that is in a direction opposite to the angle of the blades 27 of the inlet unit 21. The rotor 75 can be removably attached to the shaft 45 by any suitable means, like those shown in FIG. 3 including a socket head fastening screw device 81, a core 83, a tapered sleeve fixture 85, a tightening nut 87 and a sleeve fastener 89.

Figure 6A:
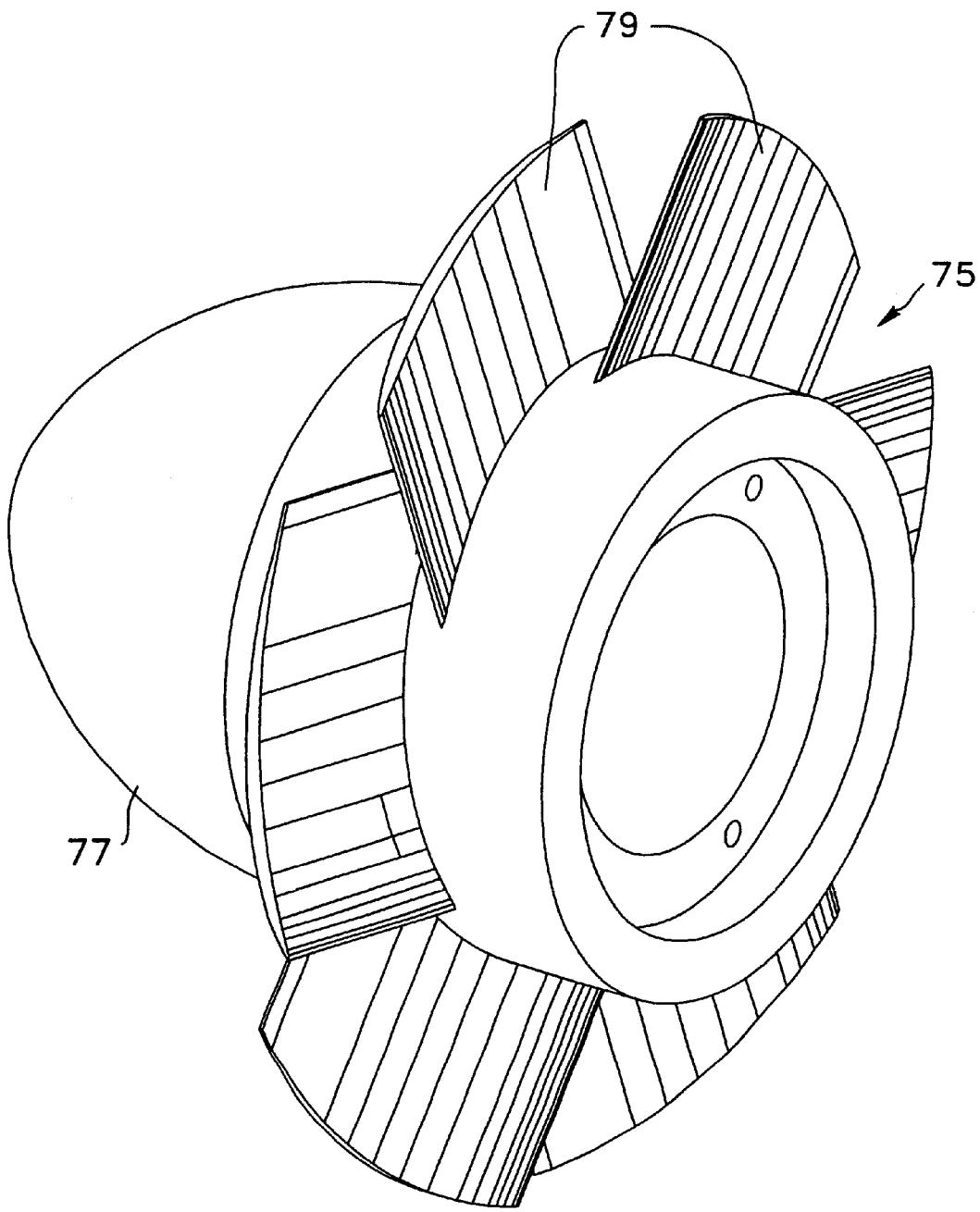
FIGS. 6a, 6b and 6c are front perspective, side elevational and front elevational views, respectively, of the rotor of the turbine according to the preferred embodiment of the invention shown in FIGS. 1 to 2.
Figure 6C:
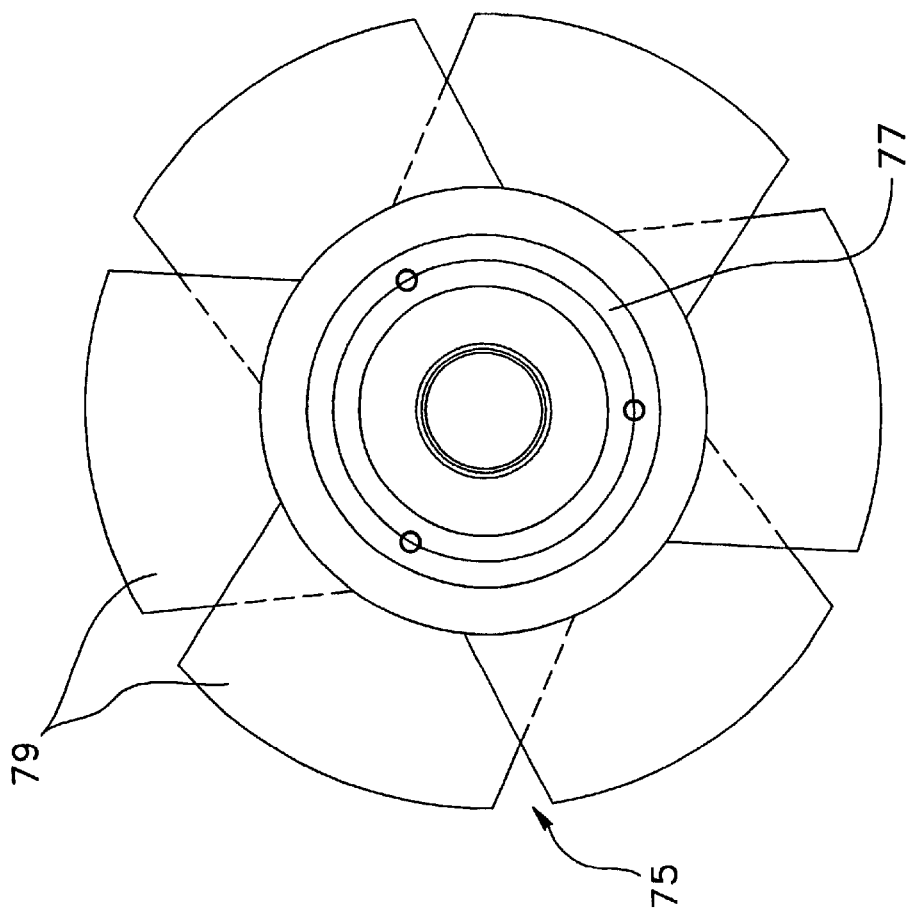
Figure 6B:
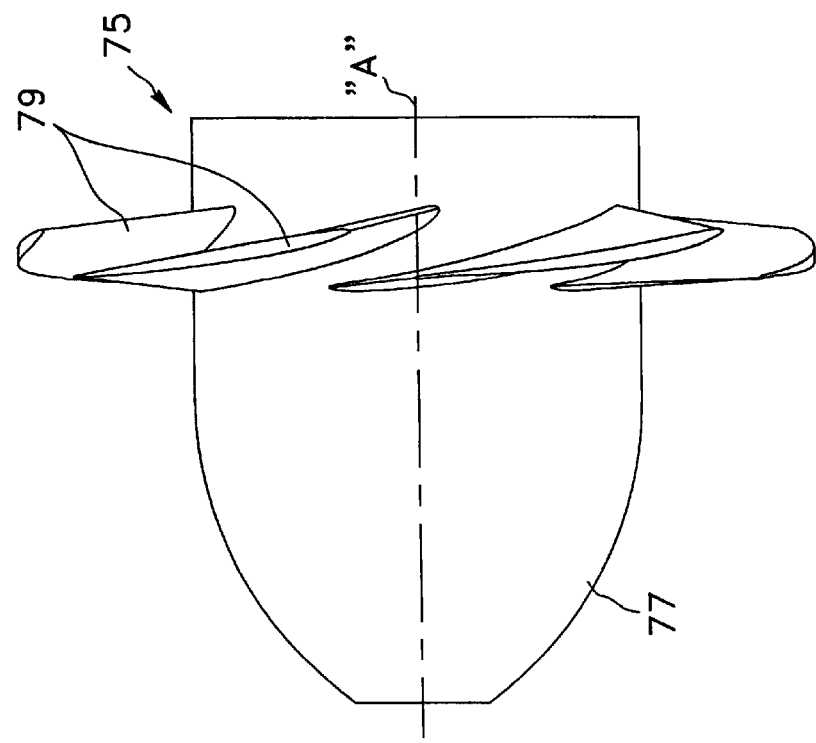

As shown in FIGS. 6A, 6B and 6C, the rotor 75 preferably has six blades 79. The number, shape and positioning of the blades 79 (as well as the number, shape and positioning of the blades 27) must of course be optimized. Such an optimization and the way it can be achieved is obvious for any one having some expertise in KAPLAN and Dériaz turbines, who would know, for example, that the surface area of the rotor should be smooth and the height of any defects in the rotor's surface should be inferior to 0.005 inch. On surfaces that may be subject to cavitation, such defects should be inferior to 0.01 inch. These values should only be exceeded in isolated cases.

The one skilled in the art would also know that the inclination of blades with respect to each other should be controlled to obtain optimal energetic results. The difference between the inclinations of the different blades should not exceed 0.25° and the difference between the axial positions of the blades along the core of the rotor should not exceed 0.2% of the diameter of the same for optimal results.

As can now be better appreciated, the seven fixed blades 27 of the turbine 1 "compresses" water towards the six blades 79 of the rotor 75 fastened to a shaft 45 which extends into the 45° angled outlet unit. The shaft 45 passes through the water-tight-spacer seal and roller-bearing case 53 and it supplies power by direct connection or via a driving belt 19 to the generator 17.

Tests carried out by the Applicant have shown that the axial type, hydro-electric turbine 1 is highly efficient with only a water-stream downward slope of 20 to 40 meters. Its unique design performances and the particular shape of its blades, reduce the problem of cavitation to almost zero. As is known, cavitation is due to compressed air bubbles which, by bursting, create vibrations and change the aerodynamics of the flow, thereby causing damage to the blades and the main shaft.

Another originality of the turbine 1 according to the invention resides in its manufacture by casting and its modularity. The fact that its components may be assembled by bolts, screws and conventional anchoring pieces allows it to be assembled in place and used by a non-specialized worker. Such gives a time advantage for assembly and maintenance. Any down-time due to maintenance and/or repair is minimal, thereby insuring that the turbine is more than cost-competitive.

Without being bound to any specific values, the size of the various components of turbine 1 preferably ranges as follows:

for the cylindrical inlet 21: from about 30 cm to about 1.2 m in diameter and from about 15 cm to about 1 m in length;

for the tubular outlet 35: from about 30 cm to about 1.2 m in diameter and from about 80 cm to about 3.25 m in length;

for the shaft 45: from about 4.5 cm to about 25 cm in diameter and from about 1 m to about 4.25 m in length; and for the rotor: from about 30 cm to about 1.2 m in diameter and from about 23 cm to about 95 cm in length.

A person skilled in the art will easily understand that these values are indicative only and that they are therefore non limitative. Such a person should be able to easily calculate the various size and relative proportions of the turbine components and obtain a functional and effective turbine devised for a specific use.

Typical working examples of the modular hydraulic turbine according to the invention would preferably have the following characteristics:

EXAMPLE 1

Capacity of production: 150 kW

Size of the duct: interior diameter: 50 cm, exterior diameter: 55 cm;

Water height: 30 meters

Normal water stream: 0.535 m$^3$/s

Rotational speed of the rotor: 1200 RPM

Type of the electric power generator: synchronous or asynchronous, 200 kW

Total monthly capacity: about 101 835 kW

EXAMPLE 2

Capacity of production: 50 kW

Size of the duct: interior diameter: 30 cm, exterior diameter: 35 cm;

Water height: 30 meters

Normal water stream: 0.19 m$^3$/s

Rotational speed of the rotor: 1800 RPM

Type of the electric power generator: synchronous or asynchronous, 75 kW

Total monthly capacity: about 33 945 kW

Figure 7:
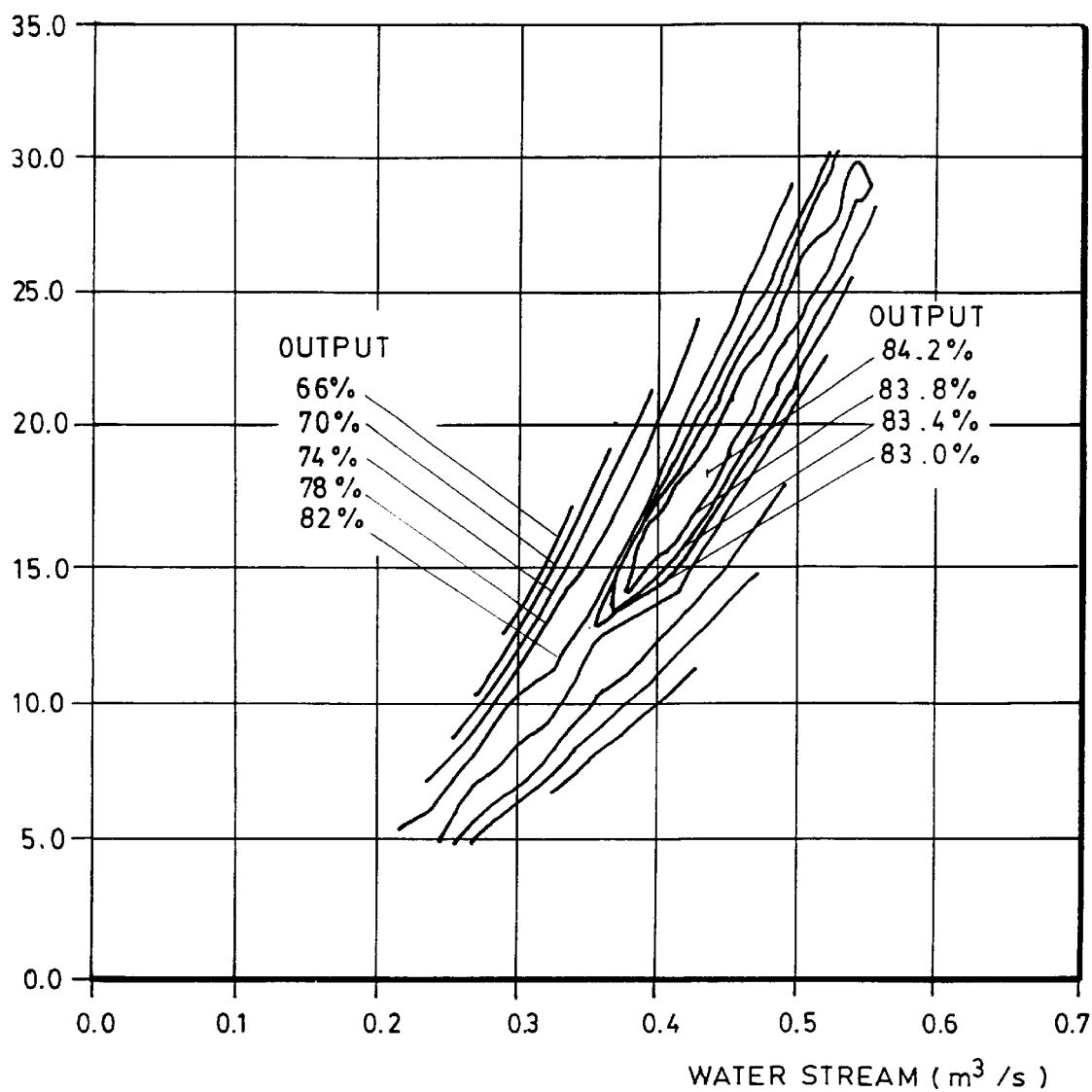
FIG. 7 is a graphic illustrating the results (output hill) obtained during a working test using a 150 kW turbine according to the present invention.
Figure 8:
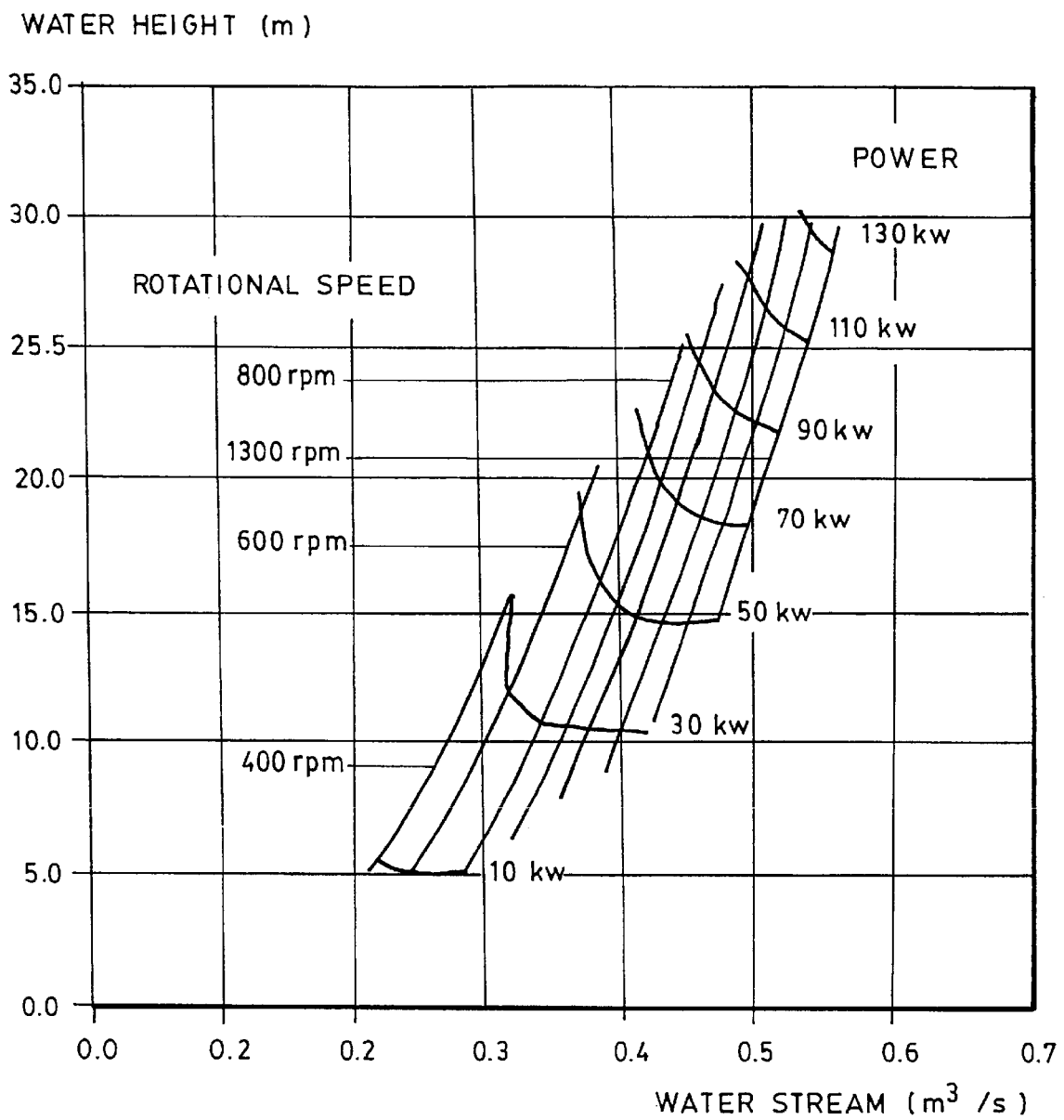
FIG. 8 is a graphic illustrating the results (isospeeds and isopowers) obtained during a working test using a 150 kW turbine according to the present invention.

Working tests using a 150 kW turbine are shown in FIGS. 7 and 8. A person skilled in the art can readily appreciate the value of the results obtained which clearly demonstrate the effectiveness of the turbine of the present invention as compared with the art.

Depending on the size of the turbine, the rotational speed of the rotor, the water height and the water stream, it is possible to generate from 10 kW/hour to 1200 kW/hour using the turbine of the present invention. As aforesaid, its principal asset is that it is quite easy to build (by casting) and repair. It also requires less than half of the water current necessary by the closest competitive technologies. As a matter of fact, it only needs one half of cubic meter of water per second to produce 150 kW/hour. Its main advantages are as follows:

1. no need for a dam;
2. ecologically friendly;
3. very competitive production costs;
4. useable in watersheds otherwise considered as unavailable and/or unsuitable;
5. very easy to maintain and repair;
6. almost total absence of cavitation by proper selection of its blades
7. non polluting
8. water-cooled; and
9. long lasting resistance to wear.

Of course, numerous modifications could be made to the turbine according to the preferred embodiment of the invention disclosed hereinabove without departing from the scope of the present invention as defined in the appended claims.

What is claimed is:

1. A modular hydraulic turbine comprising:

a cylindrical inlet unit through which water may enter, said inlet unit being made of one piece and having a longitudinal axis, a central cone-shaped hub provided with a central rearwardly opening cavity aligned with the longitudinal axis, and a plurality of incurved blades projecting radially at a same first angle all around said hub;

a tubular outlet unit made of one piece, said outlet unit having a front portion and a rear portion, the front portion being cylindrical in shape and having a longitudinal axis coaxial with the axis of the cylindrical inlet unit, the rear portion extending at an angle relative to the front portion;

means for rigidly connecting the inlet and outlet units to form a bent tubular water tight housing through which water may flow;

a shaft coaxial with said longitudinal axis, said shaft having a front end portion extending at least partially and rotatably into the central cavity of the hub, a central portion extending within the front portion of the outlet unit, and a rear end portion engaging the rear portion of the outlet unit and extending outside said housing;

a casing coaxial with the longitudinal axis and rigidly connected to the outlet unit outside of said outlet unit, said casing comprising sealing means for providing a watertight joint at a spot where the shaft extends outside the housing, and mounting means for rotatably supporting the rear end of said shaft; and a hollow rotor rigidly connected to the shaft, said rotor being mounted proximate the hub and comprising a central core and a plurality of incurved blades projecting radially outwardly at a same second angle all around the core, said second angle being in a direction opposite to the first angle of the blades of the hub, said rotor causing said shaft to rotate when water flows inside said housing.

2. The modular hydraulic turbine of claim 1, wherein:

the hollow rotor is cone-shaped and define together with the hub an ovoid-shaped member; and the ovoid-shaped member comprises lubrication means for lubricating the front end portion of the shaft extending into the central cavity of the hub.

3. The modular hydraulic turbine of claim 2, wherein said lubrication means comprises:

an axial hole extending from the rearwardly opening cavity of the hub up to a front exterior surface thereof; and spacing means connected to said rearwardly opening cavity for providing a gap between the hub and the rotor, the axial hole, the rearwardly opening cavity and spacing means providing a path wherein water may flows, thereby lubricating and cooling the front end portion of the shaft.

4. The modular hydraulic turbine of claim 1, wherein the inlet unit, the outlet unit, the shaft, the rotor and/or the casing are made of a material selected from the group consisting of stainless steel, plastic materials and aluminum.

5. The modular hydraulic turbine of claim 1, wherein the means for rigidly connecting the inlet and the outlet units comprise socket head fastening bolts.

6. The modular hydraulic turbine of claim 1, wherein the mounting means for rotatively supporting the rear end of the shaft comprises an oil lubricated roller bearing.

7. The modular hydraulic turbine of claim 1, wherein the central rearwardly opening cavity and the front end portion of the shaft extending therein are coated with a plastic coating, said coatings providing a snug fit between said front end portion and said cavity.

8. The combination of a modular hydraulic turbine according to claim 1 with an electric power generator, said generator being operatively connected to the rear end portion of the shaft outside said housing for producing electric energy upon rotation of said shaft.

9. The combination of a modular hydraulic turbine with an electric power generator according to claim 8, having an electric production capacity of from about 10 kW/h to about 1200 kW/h.

10. The combination of a modular hydraulic turbine with an electric power generator according to claim 9, wherein said electric generator produces about 150 kW/h when water flows inside the housing of the turbine at a flow of about one half cubic meter of water per second.

11. A modular hydraulic turbine comprising:

a cylindrical inlet unit through which water may enter, said inlet unit being made of one piece and having a longitudinal axis, a central cone-shaped hub provided with a central rearwardly opening plastic-coated cavity aligned with said longitudinal axis and a plurality of incurved blades projecting radially at a same first angle all around said hub;

a tubular outlet unit made of one piece, said outlet unit having a front portion and a rear portion, the front portion being cylindrical in shape and having a longitudinal axis coaxial with the axis of the cylindrical inlet unit, the rear portion extending at an angle relative to the front portion;

means comprising socket head fastening bolts for rigidly connecting the inlet and outlet units to form a bent tubular water tight housing through which water may flow;

a shaft coaxial with said longitudinal axis, said shaft having a front end portion coated with a plastic coating and extending at least partially and rotatably into the central cavity of the hub, a central portion extending within the front portion of the outlet unit and a rear end portion engaging the rear portion of the outlet unit and extending outside said housing;

a casing coaxial with the longitudinal axis and rigidly connected to the outlet unit outside of said outlet unit, said casing comprising sealing means for providing a watertight joint at a spot where the shaft extends outside the housing and mounting means consisting of an oil lubricated bearing for rotatively supporting the rear end of said shaft;

a hollow cone-shaped rotor rigidly connected to the shaft, said rotor being mounted proximate the hub and comprising a central core and a plurality of incurved blades projecting radially outwardly at a same second angle all around the core, said second angle being in a direction opposite to the first angle of the blades of the hub, said rotor and hub defining together an ovoid-shaped member, said rotor causing the shaft allowing said shaft to rotate when water flows inside said housing; and lubrication means comprising an axial hole extending from the rearwardly opening cavity of the hub up to a front exterior surface thereof, and spacing means connected to said rearwardly opening cavity for providing a gap between the hub and the rotor, said axial hole, rearwardly opening cavity and spacing means provid ing a path wherein water may flows thereby lubricating and cooling the first end portion of the shaft, the inlet unit, the outlet unit, the shaft, the rotor and/or the casing being made of a material selected from the group consisting of stainless steel, plastic materials and aluminum.

12. The combination of a modular hydraulic turbine according to claim 11 with an electric power generator, said generator being operatively connected to the second end portion of the shaft outside said housing for producing electric energy upon rotation of said shaft.

13. The combination of a modular hydraulic turbine with an electric power generator according to claim 12 having an electric energy production capacity of from about 10 kW/h to about 1200 kW/h.

14. The combination of a modular hydraulic turbine with an electric power generator according to claim 13, wherein said electric generator produces about 150 kW/h when water flows inside the housing of the turbine at a flow of about one half cubic meter of water per second.

* * * * *

US006267551C1

(12) EX PARTE REEXAMINATION CERTIFICATE (5266th)
United States Patent
Dentinger

(10) Number: US 6,267,551 C1
(45) Certificate Issued: Feb. 7, 2006

(54) MODULAR HYDRAULIC TURBINE

(75) Inventor: Jean-Claude Dentinger, Beauport (CA)

(73) Assignee: NRJO, Inc., Quebec (CA)

Reexamination Request:
No. 90/006,762, Aug. 25, 2003

Reexamination Certificate for:
| Patent No.: | 6,267,551 |
| Issued: | Jul. 31, 2001 |
| Appl. No.: | 09/420,317 |
| Filed: | Oct. 19, 1999 |

(51) Int. Cl.
 *F03B 11/02* (2006.01)

(52) U.S. Cl. .................. 415/3.1; 415/191; 415/229; 415/230; 415/214.1

(58) Field of Classification Search ............ 415/3.1, 415/4.3, 4.5, 111, 176, 180, 182.1, 191, 199.4, 415/213.1, 214.1, 219.1, 229, 230, 906, 908; 416/198 A, 198 R, 203
See application file for complete search history.

(56) References Cited

U.S. PATENT DOCUMENTS

| 1,476,998 | A | * | 12/1923 | Nagler ..................... 415/221 |
| 3,184,218 | A | * | 5/1965 | Hochwalt et al. ........... 415/117 |
| 3,758,177 | A | * | 9/1973 | Williams .................... 384/113 |
| 4,573,827 | A | * | 3/1986 | Mayo, Jr. .................... 405/78 |
| 4,955,789 | A | * | 9/1990 | Chacour et al. ............. 415/201 |

FOREIGN PATENT DOCUMENTS

DE 29815858 U1 * 11/1998

OTHER PUBLICATIONS

"Final Report on the 120 kW Axial Flow Turbine for Heads Around H=30m", University Laval, Quebec City, Canada, Apr. 11, 1989.
"Hydro Electric Turbines of Small and Medium Power", Les Industries Fanny Inc., Quebec City, Canada, Jan. 1991.
"Continuous Operation Testing of 100kW Hydroelectric Micro–Turbine or Micro–Turbine Test Stand, Final Report Technical Part", University Laval, Quebec City, Canada, Mar. 28, 1995.
"Low and Medium Hydro–Electric Micro Power Stations", Turbines–Hydro Energie Canada Industries Inc., Quebec City, Canada, 1995.

* cited by examiner

*Primary Examiner*—Ninh H. Nguyen

(57) ABSTRACT

A modular hydraulic turbine made of a small number of components that are cast or molded, and that can easily be assembled and/or interchanged whenever required. The turbine has a cylindrical inlet unit through water may enter and an angular tubular outlet unit through water may enter escape; a central cone-shaped hub having a plurality of incurved blades; a shaft having a front end extending into the hub and a rear end portion engaging and extending outside the outlet unit; a hollow rotor rigidly connected to the shaft and having a plurality of incurved blades, the rotor causing the shaft to rotate when water flows inside the turbine; and a watertight casing for rotatably supporting the rear end of the shaft. The rear end portion of the shaft of the turbine is devised to be connected to a power generator, especially an electric generator, to produce energy upon rotation of the shaft. Depending on its size and the strength of the water stream, from 10 to 1200 kW/hour can easily be generated.

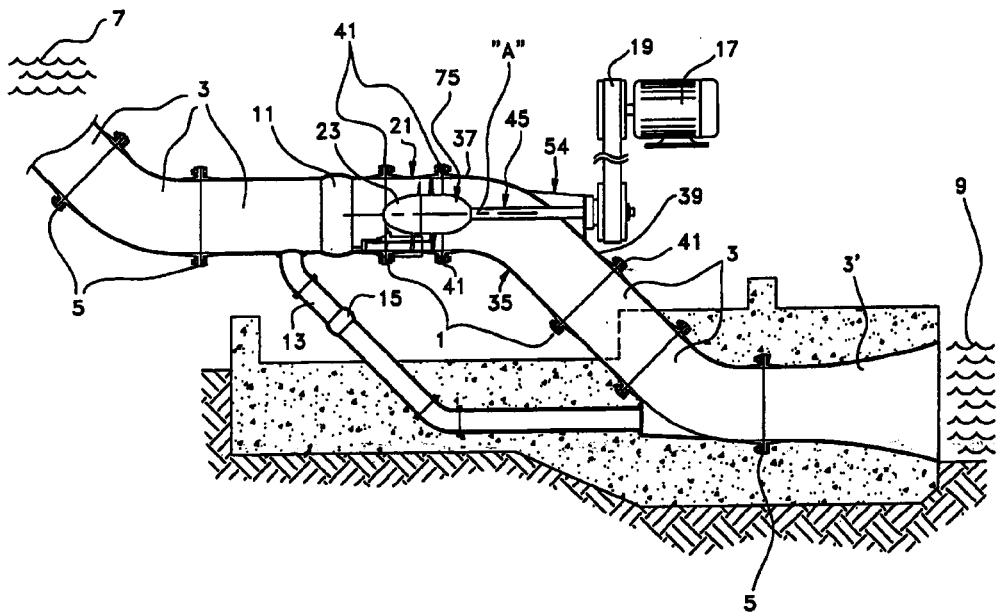

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–14 are cancelled.

* * * * *